C. Rose,
Scroll Sawing Machine,
№ 29,009. Patented July 3, 1860.
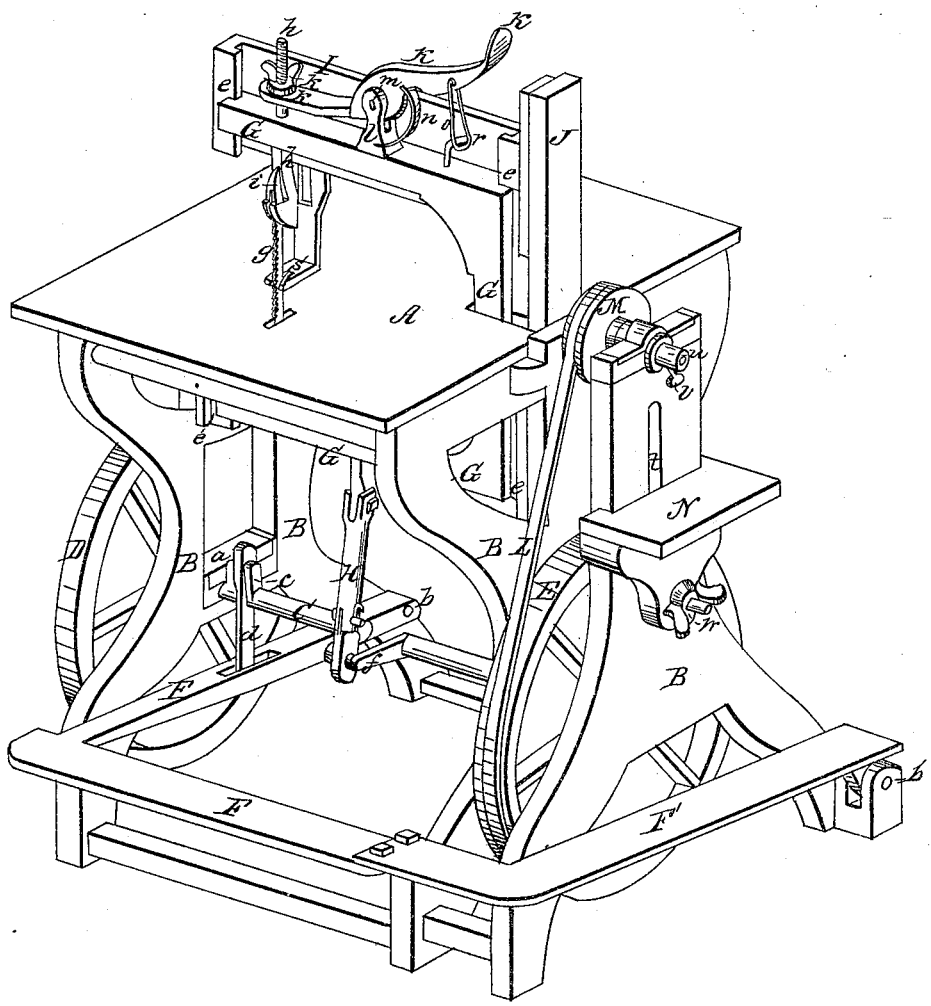
Witnesses:
E. Cohen
J. Hirsch
Inventor;
Charles Rose
per atty. A. B. Stoughton

UNITED STATES PATENT OFFICE.

CHARLES ROSE, OF ALLENTOWN, PENNSYLVANIA.

DEVICE FOR STRAINING SCROLL-SAWS.

Specification of Letters Patent No. 29,009, dated July 3, 1860.

*To all whom it may concern:*

Be it known that I, CHARLES ROSE, of Allentown, in the county of Lehigh and State of Pennsylvania, have invented certain new and useful Improvements in Scroll-Sawing Machines; and I do hereby declare the following to be a full, clear, and exact description of the same, reference being had to the accompanying drawing, making a part of this specification, and which represents in perspective a view of the entire machine.

My invention consists in the mechanism by which I catch, and strain up, the scroll saw so that it may be readily detached, removed or replaced by another.

To enable others skilled in the art to make and use my invention, I will proceed to describe the same with reference to the drawings.

A, represents a table supported on legs B, B, so as to make a permanent frame work. In suitable bearings *a* upon this frame, is hung a crank shaft *c*, having upon one or both of its ends a fly, or pulley wheel D, E, which, for the purposes of a regular motion may be loaded opposite to the dead centers of the cranks.

F, is a treadle, pivoted at *b* to the main frame, and connected to the crank, *c* on the crank shaft, by pitmen *d*, for the purpose of giving motion to the crank shaft, and through it the other operative parts of the machine.

G, is a saw-gate that moves upon guides *e*. To the lower end of this saw-gate, is connected one end of a pitman H, the other end of which is connected to a crank *f*, on the crank shaft.

I, is a metallic arm firmly connected to a supporting piece J; this arm and supporting piece contain guides for the saw-gate to work in or on, and the arm and supporting piece instead of being in two pieces, may be made in one piece of metal, if so preferred. The saw-gate G, may be made of metal in one piece, and that side of it next the sawing point is left open to admit of turning the stuff that is being sawed.

The saw *g*, is attached at its lower end to the gate arm, in any of the usual ways, and the upper end of the saw has a block *i* upon it which catches over a shoulder on the noddle iron *h*, so that it may be readily detached therefrom, or connected thereto. This noddle-iron *h*, passes through the upper gate arm, and has a screw thread cut upon its upper end, upon which a thumb nut *k* runs.

K, is a bent lever, pivoted at *m*, in a fulcra post *l*, fixed to the gate arm. The point of this lever K passes over the shank of the noddle iron, and the thumb nut *k*, is run down upon this point. Behind the fulcra of the bent lever, there is a spring *n*, pressing against the lever to keep it up, and a link *o* in the lever that catches over a hook *r* on the gate arm.

*s*, is an adjustable presser foot the forks of which straddle the saw. This foot is to hold the stuff to the table, or prevent the saw from lifting it from the table.

For the purpose of making this a shop-machine I have connected with it a boring tool, which is always convenient, and sometimes necessary, in making an opening through the wood to run the saw through, or to start it in, when the scroll work is of such character, as not to run out to the edges.

Around the wheel E, passes an endless belt L, that runs over a pulley M, to give said pulley motion. The shaft of the pulley M, has a socket *u* in it, which will receive the shank of any ordinary boring tool, and it may be held therein by a set screw *v*.

N is a table made adjustable on the frame B, by means of the slot *t*, and set screw and nut *w*, and is designed for holding the stuff to the boring tool, in proper position.

To enable the operator to work the boring tool which is remote from his position when attending and working the saw the treadle (F') extends clear around to the end of the machine, so that the crank shaft may be driven from either position viz: at the side or end.

When the saw is to be detached the link *o*, is moved from the hook *r*, and the saw is loose. When the link is thrown off from the hook, the spring *n* throws up the rear end of the lever K, while its point descends, and the moment the strain is taken off the thumb nut *k*, the noddle iron *h* drops, and the end of the saw connected with it becomes detached. To catch up the end of the saw, its block is placed in the recess in the noddle iron, and the lever K is brought down, and its link placed over the hook *r*. If the saw is not sufficiently strained by the lever and link alone, a turn may be given to the thumb nut *k*, which will strain it up tight.

Having thus fully described the nature and object of my invention what I claim therein as new and desire to secure by Letters Patent is—

The combination of the lever, link, hook, thumb-nut, and noddle-iron, substantially as herein described, for the purpose of making a convenient and effective connecting and disconnecting device for the saws of scroll sawing machines, and for straining them up in the gate as set forth.

CHARLES ROSE.

Witnesses:
 THOMAS YEAGER,
 A. K. WITTMAN.